US012012826B2

(12) United States Patent
Hegde et al.

(10) Patent No.: US 12,012,826 B2
(45) Date of Patent: Jun. 18, 2024

(54) FIELD DEVELOPMENT PLANNING BASED ON DEEP REINFORCEMENT LEARNING

(71) Applicant: Schlumberger Technology Corporation, Sugar Land, TX (US)

(72) Inventors: Vishakh Hegde, Menlo Park, CA (US); Joseph Matthew Chalupsky, Abingdon (GB)

(73) Assignee: SCHLUMBERGER TECHNOLOGY CORPORATION, Sugar Land, TX (US)

(*) Notice: Subject to any disclaimer, the term of this patent is extended or adjusted under 35 U.S.C. 154(b) by 370 days.

(21) Appl. No.: 17/596,302

(22) PCT Filed: Jun. 21, 2019

(86) PCT No.: PCT/US2019/038489
§ 371 (c)(1),
(2) Date: Dec. 7, 2021

(87) PCT Pub. No.: WO2020/256738
PCT Pub. Date: Dec. 24, 2020

(65) Prior Publication Data
US 2022/0220828 A1    Jul. 14, 2022

(51) Int. Cl.
*G06Q 10/0631* (2023.01)
*E21B 41/00* (2006.01)
(Continued)

(52) U.S. Cl.
CPC ............ *E21B 41/00* (2013.01); *G06Q 10/04* (2013.01); *G06Q 10/0631* (2013.01);
(Continued)

(58) Field of Classification Search
CPC ...... E21B 41/00; E21B 2200/20; E21B 43/30; G06Q 10/04; G06Q 10/0631; G06Q 10/06313; G06Q 10/06; G06N 3/08
See application file for complete search history.

(56) References Cited

U.S. PATENT DOCUMENTS 7,395,252 B2*   7/2008   Anderson .............. G06Q 10/04
                                                                706/45
2004/0220790 A1   11/2004   Cullick et al.
(Continued)

FOREIGN PATENT DOCUMENTS

| EP | 3467717 A1 | 4/2019 |
| JP | 2018005739 A | 1/2018 |
| WO | 2018053187 A1 | 3/2018 |

OTHER PUBLICATIONS

International Preliminary Report on Patentability issued in International Patent Application No. PCT/US2019/038489 on Dec. 30, 2021; 8 pages.
(Continued)

Primary Examiner — John R Wallace
(74) Attorney, Agent, or Firm — Jeffrey D. Frantz

(57) ABSTRACT

A method may include determining an action associated with field development planning or asset management of an oilfield based on a policy or value function and a state, simulating a reward of the action using information identifying the action and the state as inputs, generating an experience record based on executing the simulation, wherein the experience record identifies the simulated reward associated with the action and a current state or resulting state, storing the experience record in an experience buffer, wherein the experience buffer stores a plurality of previously generated experience records, updating the policy or value function based on the information stored in the experience buffer, selecting an action related to the field
(Continued)

development planning based on the updated policy, and displaying information representing the action.

20 Claims, 7 Drawing Sheets

(51) Int. Cl.
    *G06Q 10/04*     (2023.01)
    *G06Q 50/08*     (2012.01)

(52) U.S. Cl.
    CPC ....... *G06Q 10/06313* (2013.01); *G06Q 50/08* (2013.01); *E21B 2200/20* (2020.05)

(56) References Cited

U.S. PATENT DOCUMENTS

| | | | |
|---|---|---|---|
| 2007/0156377 A1 | 7/2007 | Gurpinar et al. | |
| 2008/0172272 A1* | 7/2008 | Back | G06Q 10/06 705/7.36 |
| 2009/0089028 A1 | 4/2009 | Sagert et al. | |
| 2015/0100530 A1 | 4/2015 | Winih et al. | |
| 2020/0303068 A1* | 9/2020 | Osogami | G06N 20/00 |

OTHER PUBLICATIONS

Extended Search Report issued in European Patent Application 19934088.6 dated Nov. 29, 2022, 7 pages.
International Search Report and Written Opinion mailed Apr. 2, 2020 in PCT/US2019/038489, 10 pages.
Bangerth et al., "On optimization algorithms for the reservoir oil well placement problem," Comput Geosci (2006) 10: pp. 303-319, Springer Science.
Torrado et al., "Optimal Sequential Drilling for Hydrocarbon Field Development Planning," vol. 31, No. 2 (2017): The Twenty-Ninth Innovative Applications of Artificial Intelligence Conference/IAAI Emerging Application Papers, Proceedings of the AAAI Conference on Artificial Intelligence (Abstract Only), 1 page.
Davidson et al., "Integrated Optimization for Rate Allocation in Reservoir Simulation," SPE 87309, revised for publication from SPE 79701, Dec. 2003 SPE Reservoir Evaluation & Engineering, pp. 426-432.
Litvak et al., "Prudhoe Bay E-Field Production Optimization System Based on Integrated Reservoir and Facility Simulation," SPE 77643, presented at the SPE Annual Technical Conference and Exhibition held in San Antonio, Texas Sep. 29-Oct. 2, 2002, 11 pages.
Pengju Wang, "Development and Applications of Production Optimization Techniques for Petroleum Fields," Phd Thesis, Mar. 2003, Standford University, 196 pages.
Volodymyr et al., "Playing Atari with Deep Reinforcement Learning," DeepMind Technologies, 2014, Accessed via the internet on Dec. 5, 2021 https://www.cs.toronto.edu/~vmnih/docs/dqn.pdf, 9 pages.
Andrej Karpathy blog, "Deep Reinforcement Learning: Pong from Pixels," Accessed via the internet on Dec. 5, 2021 http://karpathy.github.io/2016/05/31/rl/, 27 pages.
Sutton et al., "Policy Gradient Methods for Reinforcement Learning with Function Approximation," Advances in Neural Information Processing Systems 12, pp. 1057-1063, MIT Press, 2000.

* cited by examiner

FIELD DEVELOPMENT PLANNING BASED ON DEEP REINFORCEMENT LEARNING

CROSS-REFERENCE TO RELATED APPLICATIONS

This application is a National Stage Entry of International Application No. PCT/US2019/038489, filed Jun. 21, 2019.

BACKGROUND

In the oil and gas industry, Field Development Planning (FDP) includes determining the most economic placement of equipment (e.g., drilling rigs, facilities, pipelines), well-drilling and placement locations, and other types of field-related actions/operations. While developing a field, wells are placed in an oilfield with limited information to maximize yield over a production period. Hydrocarbon production takes place until the operating conditions are uneconomic. This can be as a result of insufficient reservoir pressure or higher yield of a costly production fluid or volatility in market conditions.

The well placement planning problem has been previously approached as an optimization problem often reflecting degrees of uncertainty. This optimization is may be approached as a form of an objective function. Such an objective function may be estimated by running computationally-expensive simulators to predict economic yield from reservoirs through future infrastructure to future sales points. The use of a reservoir flow simulator over a set of realizations is commonly done in order to have a representative set of potential outcomes usually involving the variance of reservoir and flow properties over time and space. For example, the Simultaneous Perturbation Stochastic Approximation (SPSA), Finite Difference Gradient (FDG), and Very Fast Simulated Annealing (VFSA) algorithms on flow simulators have been used with the objective of minimizing the number of physics simulator calls during optimization.

Other techniques for optimization formulate the decision-making problem as a static stochastic Mixed Integer Nonlinear Program (MINLP). Techniques based on local optimization and heuristic search approaches have been proposed for solving such MINLP formulations. Other techniques take into consideration the sequential nature of the problem and it as a Partially Observable Markov Decision Problem (POMDP) in which the position of wells is determined dynamically. Such information, such as geophysical, geological, petrophysical properties, are used in many places in the modeling process for supporting the well-placement determination process. However, a drawback of such an approach is that it is time consuming, both in terms of expert time and computational efficiency. It is also a complex, and potentially inaccurate set of processes that becomes more challenging as the field size and the number of possible well locations and scenarios increase. The planning and modeling process may often be very time sensitive which leads to various assumptions to limit the number of possible combinations to consider. For example, some decisions may be confined by capital expenditure or risk profile, thus reducing the number of wells that can be drilled or the discrete number of geologic descriptions that may be considered.

SUMMARY

Embodiments of the disclosure may provide a method to include determining an action associated with field development planning or asset management of an oilfield based on a policy or value function and a state, simulating a reward of the action using information identifying the action and the state as inputs, generating an experience record based on executing the simulation, wherein the experience record identifies the simulated reward associated with the action and a current state or resulting state, storing the experience record in an experience buffer, wherein the experience buffer stores a plurality of previously generated experience records, updating the policy or value function based on the information stored in the experience buffer, selecting an action related to the field development planning based on the updated policy, and displaying information representing the action.

Embodiments of the disclosure may also provide a computing system, including one or more processors, and a memory system comprising one or more non-transitory computer-readable media storing instructions that, when executed by at least one of the one or more processors, cause the computing system to perform operations. The operations include determining an associated action related to field development planning of an oilfield based on a policy or value, the current state and a resulting state, simulating a reward of the action using information identifying the action and the state as inputs, generating an experience record identifying the reward, wherein the experience record identifies the simulated reward associated with the action, a current state and a resulting state, storing the experience record in an experience buffer, updating the policy or value function based on the information stored in the experience buffer, selecting an action or physical action related to the field development planning based on the updated policy, and displaying information representing the action or physical action.

Embodiments of the disclosure may further provide a non-transitory computer-readable medium storing instructions that, when executed by one or more processors of a computing system, cause the computing system to perform operations. The operations include determining a first action associated with field development planning of an oilfield based on a policy and a first state, simulating a first reward of the first action using information identifying the first action and the first state as inputs, generating a first experience record identifying the first reward associated with the first action and the first state, storing the first experience record in an experience buffer, updating the policy based on the information stored in the experience buffer, determining a second action associated with field development planning based on the updated policy and a second state, simulating a second reward of the second action using information identifying the second action and the second state as inputs, generating a second experience record identifying the second reward associated with the second action and the second state, storing the second experience record in the experience buffer, updating the policy and additional time based on the information stored in the experience buffer selecting a physical action related to the field development planning based on the updating the policy the additional time, and displaying information representing the physical action.

It will be appreciated that this summary is intended merely to introduce some aspects of the present methods, systems, and media, which are more fully described and/or claimed below. Accordingly, this summary is not intended to be limiting.

BRIEF DESCRIPTION OF THE DRAWINGS

The accompanying drawings, which are incorporated in and constitute a part of this specification, illustrate embodiments of the present teachings and together with the description, serve to explain the principles of the present teachings. In the figures.

DETAILED DESCRIPTION

Figure 1:
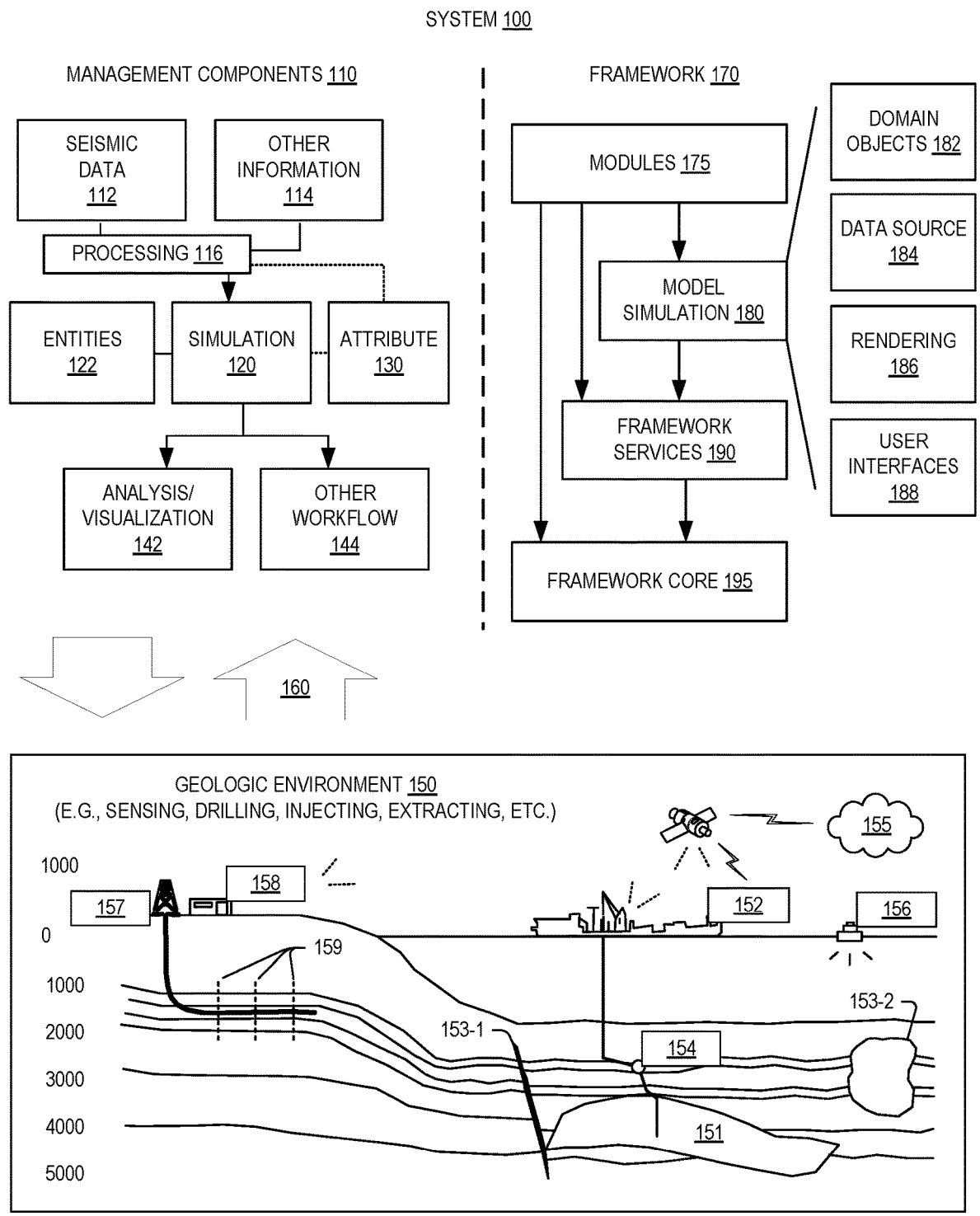
FIG. 1 illustrates an example of a system that includes various management components to manage various aspects of a geologic environment, according to an embodiment.

Current machine learning techniques may be limited to low level reasoning complexity which limits the analysis of rewards in areas of field development. Accordingly, aspects of the present disclosure implement Reinforcement Learning (RL) techniques for more intelligently analyzing the rewards of a given action or series of actions. More specifically, aspects of the present disclosure may gather development-related data during the progression of oilfield development. As more data is gathered, an AI reasoning model (e.g., neural network and/or other AI reasoning model) is built and updated, and using the neural network, new recommendations, actions, and/or policy updates are made for maximizing oilfield development rewards. As illustrative examples, recommendations, and actions may include a recommended action associated with field development planning, such as an action to move a rig to a certain position (e.g., laterally across an area), drill a well in a current location or in a different location, or progress to another point in time. Accordingly, aspects of the present disclosure provide a Deep Reinforcement Learning framework for training a machine learning system (e.g., a neural network and/or other type of machine learning system) that drives policies for selecting actions that maximize reward. As described herein, the term "action" may refer to a single action, or a sequence of multiple actions.

In some embodiments, a computer-based simulator may be used to determine the outcome (e.g., the benefit or reward) based on input information (e.g., subsurface properties, flow characteristics, etc.). Historically, may be used to relate input/output parameters to a global optimization function; however, this entails detailed variable mapping and numerous iterative simulation runs. Using techniques described herein, such as reinforcement learning, new ways to explore this relationship map are presented. In some embodiments, the input information may define a particular action that is linked to a state and a policy. As defined herein, an "action" may include a single action or a series of multiple actions. As defined herein, a "state" refers to an environmental or operational state. Examples of a state may include an estimate of oil distribution, an historical oil production rate, a rig location, a well location, and/or other information as new wells are drilled (e.g., for more accurately estimating oil distribution and oil production rates). The simulator may produce information corresponding to an experience, which identifies an initial state, the action taken, the new state that results from the action taken, and the reward or outcome of the action (which may be based on a comparison between the initial state and the new state). As one illustrative, non-limiting example, an "experience" may identify an initial state (e.g., an initial oil distribution estimate), an action (e.g., moving a rig one cell to the left), a new state (e.g., an updated oil distribution estimate as a result of the action), and the reward or outcome (e.g., the increase in oil distribution between the initial and updated oil distribution estimates). This experience may be stored in an experience buffer, or a database of experiences. This process may be repeated in order to generate and store multiple different experiences in the experience buffer in which the experiences are based on an existing policy. In some embodiments, the policy may be derived from a neural network.

As further discussed herein, the experiences stored in the experience buffer may be used to generate a new policy, thus modifying the actions that are taken given a particular state. The new policy may then be fed back to the simulator to generate new experiences from the new policy. Each iteration of policy updates may increase the reward of each state, and may use the data gathered during the progression of field development as experience data for aiding in policy updates. The result of each policy update iteration is a new policy that produces an action prediction that increases the reward tied to the field development. As non-limiting examples, a policy update (e.g., a policy to perform a particular action under a particular state) may increase the reward, such as reduction in deployment costs, reduction in deployment resource consumption, etc. In this way, aspects of the present disclosure provide a reinforcement learning system using deep learning and neural networks in which a reward can be maximized from a sequence of decisions and actions. Further, a policy may be obtained, which prescribes a decision or action to take provided the state of the simulator. Alternatively, this logic can be used to explore not only to seek maximums but also to explore a variety of options.

In some embodiments, the simulator may be configured to determine a reward based on oil and gas recovery in relation to a cost of exploitation. That is, the simulator may be configured with a set of parameters used to determine the reward. For example, the simulator may be configured with a recovery mechanism associated with a hydrocarbon field (e.g., deep water oil reservoirs, onshore tight gas, coalbed methane, etc.). Additionally, or alternatively, the simulator may be configured with a cost scheme (e.g. export availability, drilling schedule, operational expenditure, etc.). In some embodiments, different simulators with different parameters may be used for different scenarios. Also, as non-limiting examples, the simulator may take into account reservoir physics, field operation economics, business requirements, and/or other types of inputs. By instituting this general framework around oil and gas decision-making logic, different degrees of physics can be considered from analogous flow equations to numerical reservoir flow simulation. In one example embodiment, the simulator may follow the structure of an OpenAI environment, although aspects of the disclosure are not so limited, and other types of suitable structures may be followed. In some embodiments, aspects of the present disclosure may apply to a sequential decision making domain. That is, a re-optimization maybe determined at multiple iterations, whereas previously, a full sequence is selected in one round.

Aspects of the present disclosure may include a system and/or method for improving the selection of actions to take as part of field development planning. As a result, the system and/or method may increase oilfield distribution, reduce deployment costs, reduce deployment resource consumption, or result in another quantifiable reward in field development planning. Aspects of the present disclosure may reduce the level of human labor and error involved in field development planning by incorporating a computer-based, neural-network policy that transforms subjective human decisions into objective, computer-generated decisions predicated on the use of rules in the form of policy updates. Aspects of the present disclosure may reduce the use of computer resources by using deep learning to train a neural network rather than by previous, and more computer resource-intensive optimization techniques.

Reference will now be made in detail to embodiments, examples of which are illustrated in the accompanying drawings and figures. In the following detailed description, numerous specific details are set forth in order to provide a thorough understanding of the invention. However, it will be apparent to one of ordinary skill in the art that the invention may be practiced without these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first object or step could be termed a second object or step, and, similarly, a second object or step could be termed a first object or step, without departing from the scope of the present disclosure. The first object or step, and the second object or step, are both, objects or steps, respectively, but they are not to be considered the same object or step.

The terminology used in the description herein is for the purpose of describing particular embodiments and is not intended to be limiting. As used in this description and the appended claims, the singular forms "a," "an" and "the" are intended to include the plural forms as well, unless the context clearly indicates otherwise. It will also be understood that the term "and/or" as used herein refers to and encompasses any possible combinations of one or more of the associated listed items. It will be further understood that the terms "includes," "including," "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Further, as used herein, the term "if" may be construed to mean "when" or "upon" or "in response to determining" or "in response to detecting," depending on the context.

Attention is now directed to processing procedures, methods, techniques, and workflows that are in accordance with some embodiments. Some operations in the processing procedures, methods, techniques, and workflows disclosed herein may be combined and/or the order of some operations may be changed.

FIG. 1 illustrates an example of a system 100 that includes various management components 110 to manage various aspects of a geologic environment 150 (e.g., an environment that includes a sedimentary basin, a reservoir 151, one or more faults 153-1, one or more geobodies 153-2, etc.). For example, the management components 110 may allow for direct or indirect management of measuring, drilling, injecting, extracting, etc., with respect to the geologic environment 150. In turn, further information about the geologic environment 150 may become available as feedback 160 (e.g., optionally as input to one or more of the management components 110).

In the example of FIG. 1, the management components 110 include a seismic data component 112, an additional information component 114 (e.g., well/logging data), a processing component 116, a simulation component 120, an attribute component 130, an analysis/visualization component 142 and a workflow component 144. In operation, seismic data and other information provided per the components 112 and 114 may be input to the simulation component 120.

In an example embodiment, the simulation component 120 may rely on entities 122. Entities 122 may include earth entities or geological objects such as wells, surfaces, bodies, reservoirs, etc. In the system 100, the entities 122 can include virtual representations of actual physical entities that are reconstructed for purposes of simulation. The entities 122 may include entities based on data acquired via sensing, observation, etc. (e.g., the seismic data 112 and other information 114). An entity may be characterized by one or more properties (e.g., a geometrical pillar grid entity of an earth model may be characterized by a porosity property). Such properties may represent one or more measurements (e.g., acquired data), calculations, etc.

In an example embodiment, the simulation component 120 may operate in conjunction with a software framework such as an object-based framework. In such a framework, entities may include entities based on pre-defined classes to facilitate modeling and simulation. A commercially available example of an object-based framework is the MICROSOFT®.NET® framework (Redmond, Washington), which provides a set of extensible object classes. In the .NET® framework, an object class encapsulates a module of reusable code and associated data structures. Object classes can be used to instantiate object instances for use in by a program, script, etc. For example, borehole classes may define objects for representing boreholes based on well data.

In the example of FIG. 1, the simulation component 120 may process information to conform to one or more attributes specified by the attribute component 130, which may include a library of attributes. Such processing may occur prior to input to the simulation component 120 (e.g., consider the processing component 116). As an example, the simulation component 120 may perform operations on input information based on one or more attributes specified by the attribute component 130. In an example embodiment, the simulation component 120 may construct one or more models of the geologic environment 150, which may be relied on to simulate the behavior of the geologic environment 150 (e.g., responsive to one or more acts, whether natural or artificial). In the example of FIG. 1, the analysis/visualization component 142 may allow for interaction with a model or model-based results (e.g., simulation results, etc.). As an example, output from the simulation component 120 may be input to one or more other workflows, as indicated by a workflow component 144.

As an example, the simulation component 120 may include one or more features of a simulator such as the ECLIPSE™ reservoir simulator (Schlumberger Limited, Houston Texas), the INTERSECT™ reservoir simulator (Schlumberger Limited, Houston Texas), etc. As an example, a simulation component, a simulator, etc. may include features to implement one or more meshless techniques (e.g., to solve one or more equations, etc.). As an example, a reservoir or reservoirs may be simulated with respect to one or more enhanced recovery techniques (e.g., consider a thermal process such as SAGD, etc.).

In an example embodiment, management components 110 may include features of a commercially available framework such as the PETREL® seismic to simulation software framework (Schlumberger Limited, Houston, Texas). The PETREL® framework provides components that allow for optimization of exploration and development operations. The PETREL® framework includes seismic to simulation software components that can output information for use in increasing reservoir performance, for example, by improving asset team productivity. Through use of such a framework, various professionals (e.g., geophysicists, geologists, and reservoir engineers) can develop collaborative workflows and integrate operations to streamline processes. Such a framework may be considered an application and may be considered a data-driven application (e.g., where data is input for purposes of modeling, simulating, etc.).

In an example embodiment, various aspects of the management components 110 may include add-ons or plug-ins that operate according to specifications of a framework environment. For example, a commercially available framework environment marketed as the OCEAN® framework environment (Schlumberger Limited, Houston, Texas) allows for integration of add-ons (or plug-ins) into a PETREL® framework workflow. The OCEAN® framework environment leverages .NET® tools (Microsoft Corporation, Redmond, Washington) and offers stable, user-friendly interfaces for efficient development. In an example embodiment, various components may be implemented as add-ons (or plug-ins) that conform to and operate according to specifications of a framework environment (e.g., according to application programming interface (API) specifications, etc.).

FIG. 1 also shows an example of a framework 170 that includes a model simulation layer 180 along with a framework services layer 190, a framework core layer 195 and a modules layer 175. The framework 170 may include the commercially available OCEAN® framework where the model simulation layer 180 is the commercially available PETREL® model-centric software package that hosts OCEAN® framework applications. In an example embodiment, the PETREL® software may be considered a data-driven application. The PETREL® software can include a framework for model building and visualization.

As an example, a framework may include features for implementing one or more mesh generation techniques. For example, a framework may include an input component for receipt of information from interpretation of seismic data, one or more attributes based at least in part on seismic data, log data, image data, etc. Such a framework may include a mesh generation component that processes input information, optionally in conjunction with other information, to generate a mesh.

In the example of FIG. 1, the model simulation layer 180 may provide domain objects 182, act as a data source 184, provide for rendering 186 and provide for various user interfaces 188. Rendering 186 may provide a graphical environment in which applications can display their data while the user interfaces 188 may provide a common look and feel for application user interface components.

As an example, the domain objects 182 can include entity objects, property objects and optionally other objects. Entity objects may be used to geometrically represent wells, surfaces, bodies, reservoirs, etc., while property objects may be used to provide property values as well as data versions and display parameters. For example, an entity object may represent a well where a property object provides log information as well as version information and display information (e.g., to display the well as part of a model).

In the example of FIG. 1, data may be stored in one or more data sources (or data stores, generally physical data storage devices), which may be at the same or different physical sites and accessible via one or more networks. The model simulation layer 180 may be configured to model projects. As such, a particular project may be stored where stored project information may include inputs, models, results and cases. Thus, upon completion of a modeling session, a user may store a project. At a later time, the project can be accessed and restored using the model simulation layer 180, which can recreate instances of the relevant domain objects.

In the example of FIG. 1, the geologic environment 150 may include layers (e.g., stratification) that include a reservoir 151 and one or more other features such as the fault 153-1, the geobody 153-2, etc. As an example, the geologic environment 150 may be outfitted with any of a variety of sensors, detectors, actuators, etc. For example, equipment 152 may include communication circuitry to receive and to transmit information with respect to one or more networks 155. Such information may include information associated with downhole equipment 154, which may be equipment to acquire information, to assist with resource recovery, etc. Other equipment 156 may be located remote from a well site and include sensing, detecting, emitting or other circuitry. Such equipment may include storage and communication circuitry to store and to communicate data, instructions, etc. As an example, one or more satellites may be provided for purposes of communications, data acquisition, etc. For example, FIG. 1 shows a satellite in communication with the network 155 that may be configured for communications, noting that the satellite may additionally or instead include circuitry for imagery (e.g., spatial, spectral, temporal, radiometric, etc.).

FIG. 1 also shows the geologic environment 150 as optionally including equipment 157 and 158 associated with a well that includes a substantially horizontal portion that may intersect with one or more fractures 159. For example, consider a well in a shale formation that may include natural fractures, artificial fractures (e.g., hydraulic fractures) or a combination of natural and artificial fractures. As an example, a well may be drilled for a reservoir that is laterally extensive. In such an example, lateral variations in properties, stresses, etc. may exist where an assessment of such variations may assist with planning, operations, etc. to develop a laterally extensive reservoir (e.g., via fracturing, injecting, extracting, etc.). As an example, the equipment 157 and/or 158 may include components, a system, systems, etc. for fracturing, seismic sensing, analysis of seismic data, assessment of one or more fractures, etc.

As mentioned, the system 100 may be used to perform one or more workflows. A workflow may be a process that includes a number of worksteps. A workstep may operate on data, for example, to create new data, to update existing data, etc. As an example, a workstep may operate on one or more inputs and create one or more results, for example, based on one or more algorithms. As an example, a system may include a workflow editor for creation, editing, executing, etc. of a workflow. In such an example, the workflow editor may provide for selection of one or more pre-defined worksteps, one or more customized worksteps, etc. As an example, a workflow may be a workflow implementable in the PETREL® software, for example, that operates on seismic data, seismic attribute(s), etc. As an example, a workflow may be a process implementable in the OCEAN® framework. As an example, a workflow may include one or more worksteps that access a module such as a plug-in (e.g., external executable code, etc.).

Figure 2A:
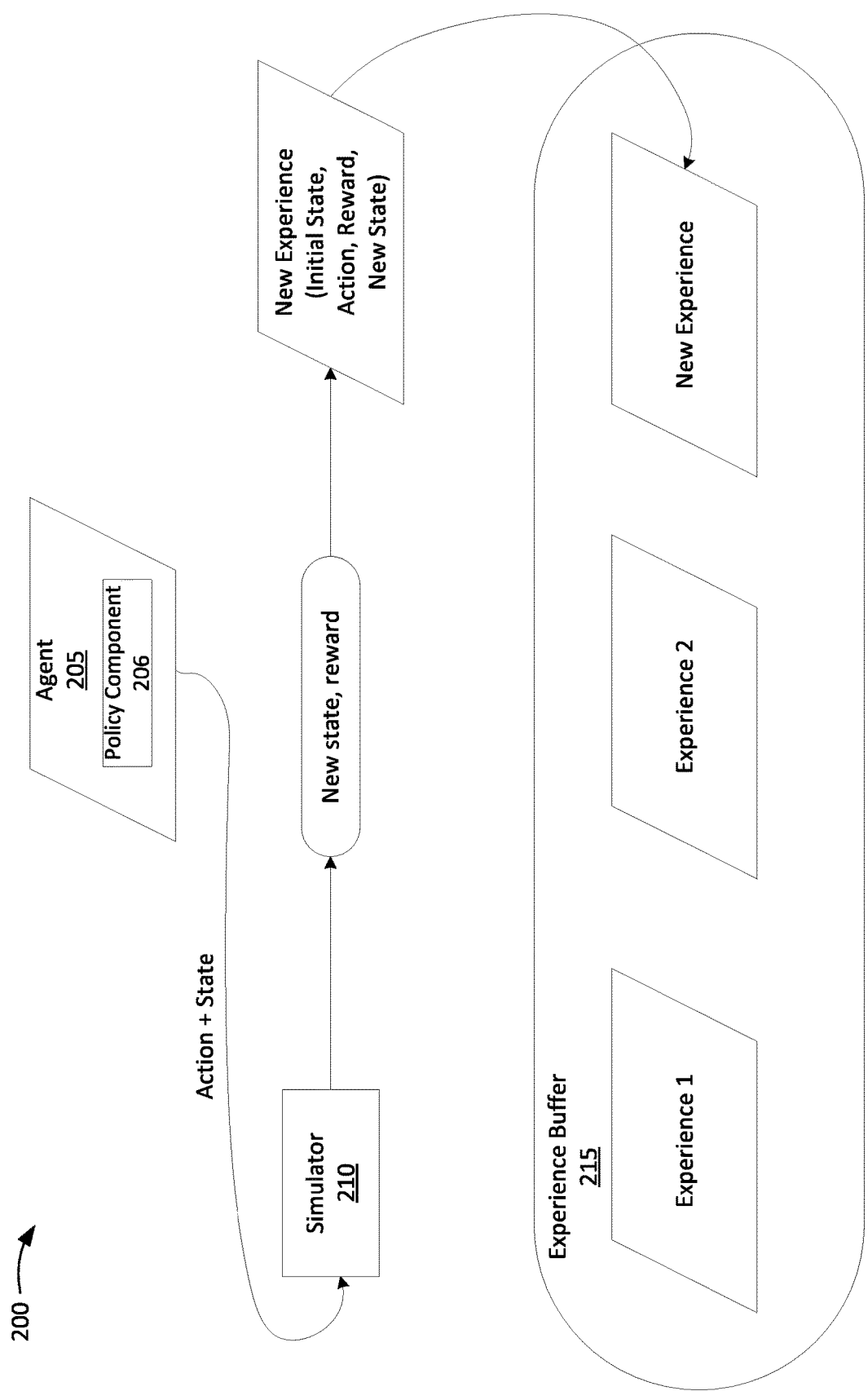
FIG. 2A illustrates an example diagram of generating experience records using a simulator.

FIG. 2A illustrates an example diagram 200 of generating experience records using a simulator. In some embodiments, the experience records may be used to adjust and/or update a policy that is used to identify actions to take based on a given operating state. As shown in FIG. 2A, an agent 205 may implement a policy component 206. In some embodiments, the policy component 206 stores a policy that defines an action linked with a current state and associated with field development planning operations (e.g., a policy to move a rig one cell or position in a grid up, down, left, right, drill well in a current location, drill well in a specified location associated with a set of longitude/latitude coordinates, or perform no action).

The agent 205 may output, to a simulator 210, information identifying a current state and a corresponding action (e.g., as defined by the policy). In some embodiments, the simulator 210 may be configured to determine a reward based on the input current state and corresponding information. In some embodiments, the reward may relate to oil and gas recovery in relation to a cost of exploitation. That is, the simulator may be configured with a set of parameters used to determine the reward. For example, the simulator 210 may be configured with a recovery mechanism associated with a hydrocarbon field (e.g., deep water oil reservoirs, onshore tight gas, coalbed methane, etc.). Additionally or alternatively, the simulator may be configured with a cost scheme (e.g. export availability, drilling schedule, operational expenditure, etc.). In some embodiments, the simulator may follow the structure of an OpenAI gym environment, or other type of suitable structure.

Based on the input action and state, the simulator 210 produce a new experience record, which may identify an original state, the action taken, the new state that results from the action taken, and the reward or outcome of the action (which may be based on a comparison between the original state and the new state). In some embodiments, the new experience record may be stored in an experience buffer 215, which stores the experience records generated by the simulator 210. The process of FIG. 2A may be repeated with different input actions and states to store multiple experience records in the experience buffer 215. Also, in addition to simulated experience records, the experience buffer 215 may store real-world experience records identifying the reward from real-world (physical) actions taken during oilfield development.

Figure 2B:
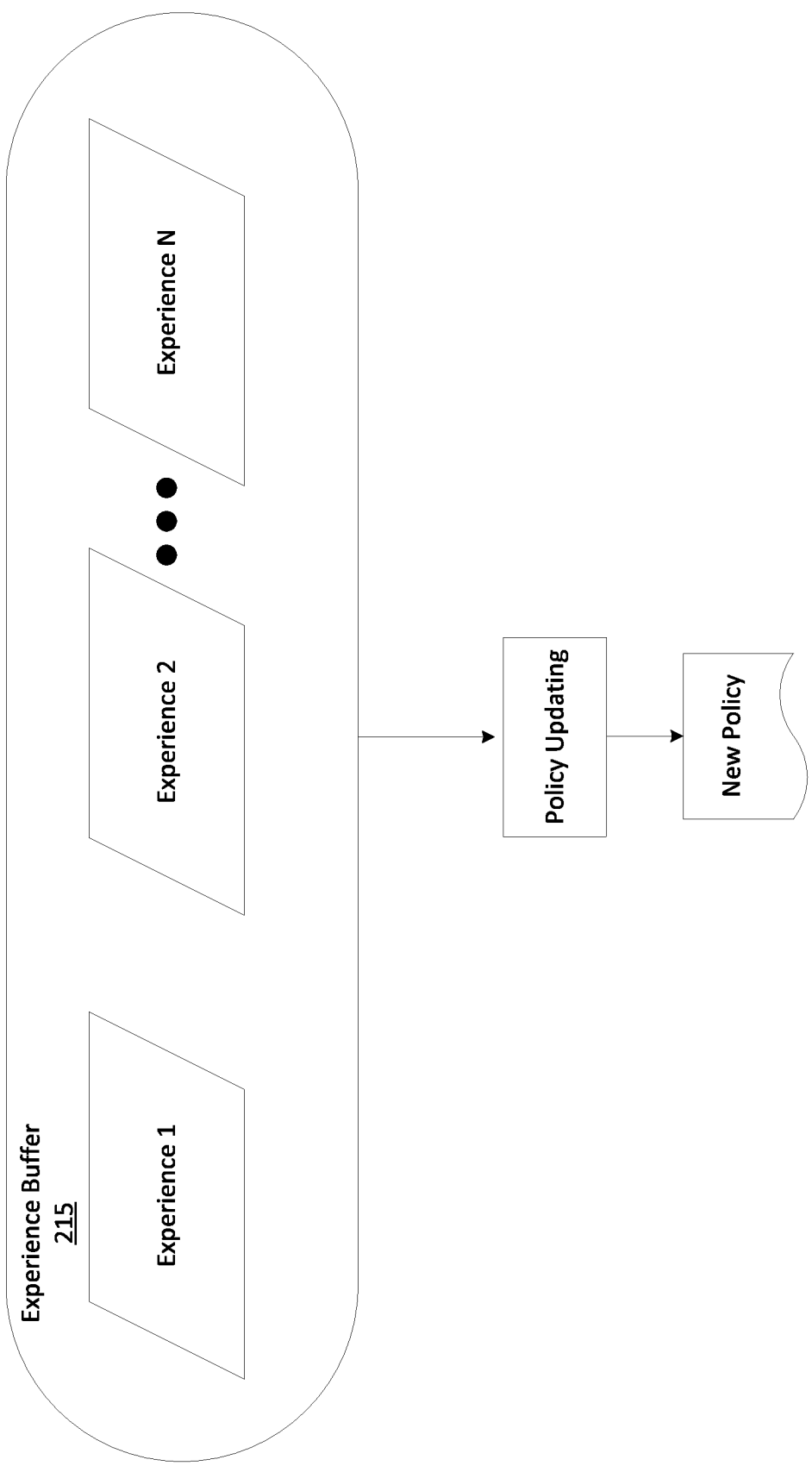
FIG. 2B illustrates an example diagram of updating a policy based on experiences stored in an experience buffer.

In some embodiments, the new experience records may be used to update a policy implemented by the policy component 206, and hence, adjust what actions are taken for a given state. For example, referring to FIG. 2B, the policy is updated, and a new policy is generated, based on the experiences stored in the experience buffer 215. In some embodiments, the policy is updated based on historical real-world and simulated experiences, and based on data that indicates how policy updates (e.g., different actions for a given state) may improve or increase the reward. In this way, as oilfield development progresses, and as more experience records are generated, policies are continuously updated to increase potential rewards. These updated policies may be used to select actions to be implemented in a real-world setting as part of oilfield development and planning. Also, updated policies may be used to generate a new experience record using the simulator 210 (e.g., as described above with respect to FIG. 2A).

Figure 2C:
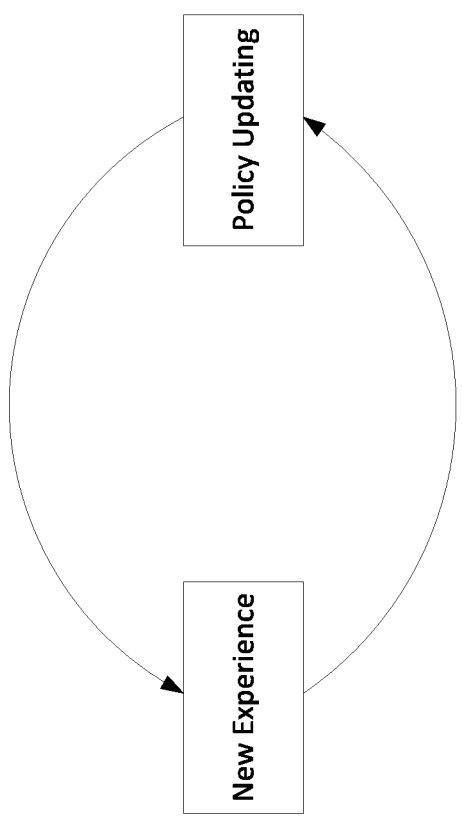
FIG. 2C illustrates an example diagram of a repeating process for training a neural network by generating a new experience based on updated policy, and using the updated policy to generate a new experience.

Referring to FIG. 2C, as new experiences records are generated (e.g., simulated and/or real-world experiences), the policy is updated. The updated policy is used to generate a new experience record, and the policy is again updated. In this way, the policy continues to be updated and refined in order to continuously improve what action is taken, and thus, the reward of a given state. In some embodiments, after a number of iterations, the policy may be used in a real-life setting in which the policy is used to select an action (e.g., in the realm of field development planning or other type of planning). For example, based on an operating or environmental state, an action may be selected and executed (e.g., by adjusting the operations of rig equipment to drill a well at a particular location/depth, moving the rig a number of cells in a particular direction, etc.). Accordingly, aspects of the present disclosure provide a Deep Reinforcement Learning framework for training a machine learning system (e.g., a neural network and/or other type of machine learning system) that drives policies for selecting actions that maximize rewards. Also, in some embodiments, an on-policy version of stochastic policy gradient algorithm uses a deep neural network to learn the policy. In some embodiments, the policy may be represented with a parametric probability distribution. In some embodiments, an initial policy may be preset and may be iteratively refined and updated in accordance with the process of FIGS. 2A-2C to improve the selection of actions that maximized rewards in the context of field development planning.

Figure 3:
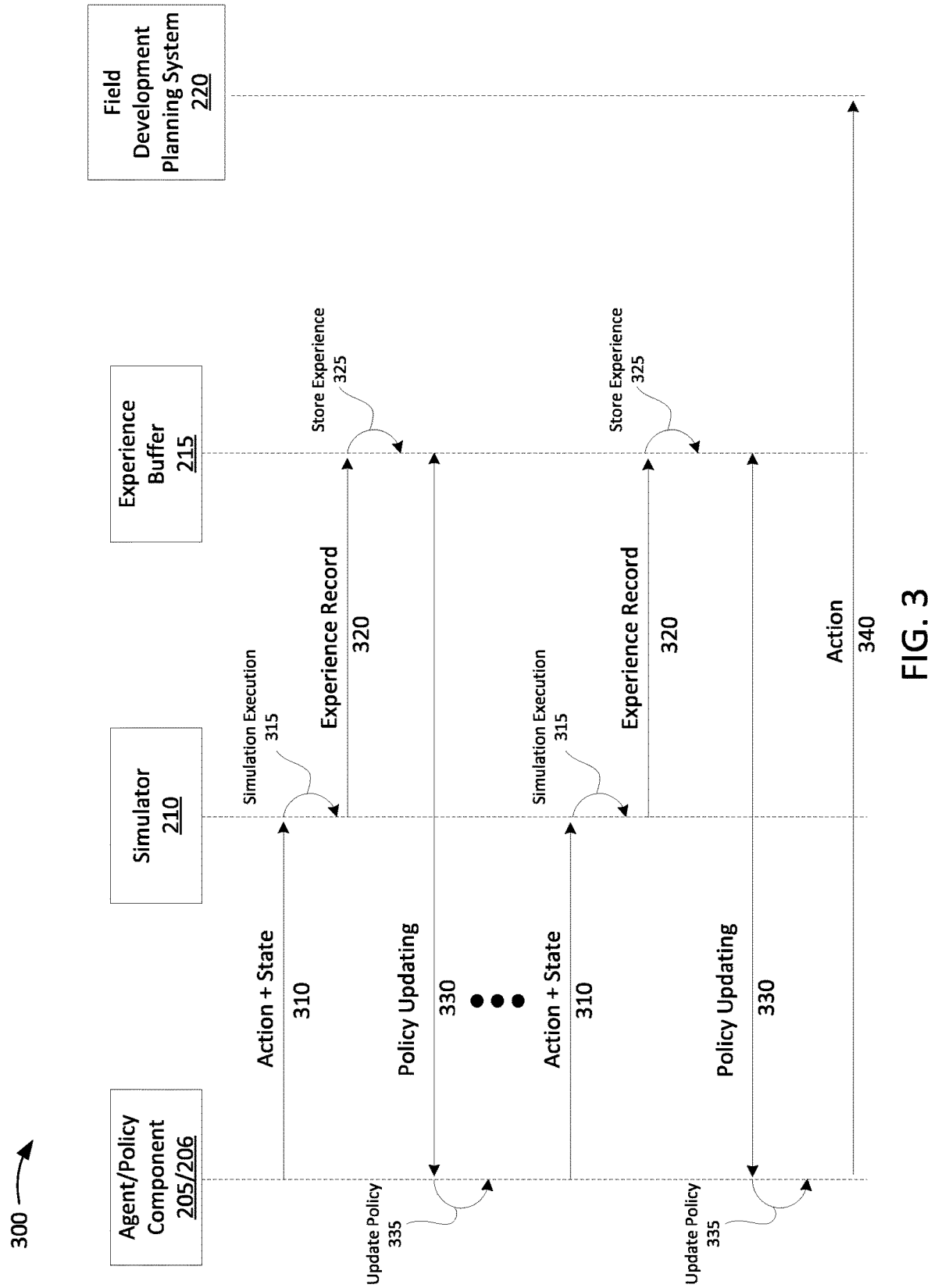
FIG. 3 illustrates a call flow diagram of an example process for updating and maintaining neural network policies for selecting actions as part of field development planning.

FIG. 3 illustrates a call flow diagram of an example process 300 for updating and maintaining neural network policies for selecting actions as part of field development planning. In some embodiments, an initial policy may be preset and may be iteratively refined and updated in accordance with process 300 to improve the selection of actions that maximize rewards in the context of field development planning. As shown in FIG. 3, an agent 205, using the policy component 206, may output information identifying a state and an action (e.g., as defined by a policy) to the simulator 210 (e.g., at 310). The simulator 210 may execute a simulation (at 315) to produce an experience record. As previously described, the simulator 210 may be configured with a set of parameters used to determine a reward associated with the input action. The experience record, produced by the simulator 210, may identify an original state, the action taken, the new state that results from the action taken, and the reward or outcome of the action.

In some embodiments, the simulator 210 may provide the experience record (e.g., at 320) to the experience buffer 215 for storage (e.g., at 325). At 330 and 335, the agent 205 may communicate with the experience buffer 215 to update the policy based on the new experience record stored by the experience buffer 215. Blocks 310-335 may be repeated to generate new experience records and update the policy each time a new experience record is generated. In this way, the policy is updated as new experiences are obtained, and a neural network is built as new experiences are obtained.

In some embodiments, two classes of Reinforcement Learning (RL) algorithms may be provided. One RL algorithm may be value based, whereas another may be policy based. In the policy based variety, a policy $\pi_\theta$ may be updated from the experiences as discussed in greater detail below. Once a policy is established, decisions may be made based on the policy directly. Compute value of states may not be necessary while making decisions.

In value based, the value of states (or a value function) may be updated based on experiences. That is, the policy may not be updated directly. The value of a state may be the expected return (e.g., cumulative reward) for a state after following a particular policy. This is denoted by $V_\pi(s)$. The Q-value is the value of a state after taking an action a, and then following the policy $\pi$. This is denoted by $Q_\pi(s,a)$. Using neural networks or other AI reasoning methods, we directly determine the Q-value, instead of the policy. Once we have a Q-values, the action we take at any state is the one that maximizes the Q-value.

As described herein, example of policy-based methods may include: a Policy Gradient Algorithm; a REINFORCE Algorithm; and an Actor Critic Methods like A2C, A3C, Impala Example of Value based techniques may include Q-Learning based algorithms like Deep Q Network (DQN), Double DQN, Dueling DQN. It is noted that any composition of policy based and value based algorithms may be implemented.

In some embodiments, the policy may be updated after one or more experiences have been generated. For example, once a threshold number of experiences are obtained using the policy, a neural network may be trained. As one illustrative, non-limiting, example, the neural network may be trained using the following example policy gradient algorithm with gradient ascent as defined below:

$$\theta_{t+1} = \theta_t + \alpha \Delta J(\theta_t) \quad (1)$$

In equation 1, $\theta_t$ are the parameters of the neural network policy at step t. $\Delta J(\theta_t)$ represents the direction of steepest ascent in the optimization valley. As $J(\theta_t)$ is to be maximized, the parameters $\theta_t$ may be adjusted such that $J(\theta_t)$ increases. Further, $\alpha$ is the learning rate for the gradient ascent algorithm, which may determine the length of the step to take in the direction of $\Delta J(\theta_t)$.

An example objective equation to be maximized is given as follows:

$$J(\theta_t) = \mathbb{E}_{\pi_\theta}[r(\tau)] \quad (2)$$

In equation 2, $\mathbb{E}_{\pi_\theta}[r(\tau)]$ is the expected total reward by based on multiple simulations using the policy $\pi_\theta$; $r(\tau)$ may represent the total reward obtained by following a single trajectory (i.e. a sequence of actions). The resulting expression is given below:

$$\theta_{t+1} = \theta_t + \Delta \mathbb{E}_{\pi_\theta}[r(\tau)] \quad (3)$$

Applying the policy gradient theorem results in the below expression:

$$\Delta J(\theta_t) = \Delta \mathbb{E}_{\pi_\theta}[r(\tau)] = \mathbb{E}_{\pi_\theta}[r(\tau)\Delta \log \pi_\theta(\tau)] \quad (4)$$

Therefore the update rule becomes:

$$\theta_{t+1} = \theta_t + \mathbb{E}_{\pi_\theta}[r(\tau)\Delta \log \pi_\theta(\tau)] \quad (5)$$

From the above expressions, it is determined that the parameters $\theta_t$ should be changed such that the action probability from the policy $\pi_\theta$ increases when a positive value exceeding at threshold for the reward $r(\tau)$ is obtained. Conversely, the action probability decreases if a negative value satisfying a threshold for the reward $r(\tau)$ is obtained. This update is repeated for any number of such interactions or until the variance in the rewards from the simulation satisfies a certain threshold.

The policy may be a neural network policy that is used to select the best course of action that maximizes a reward for a given state (e.g., the action having the highest probability from the update rule equation 5). As previously discussed, the policy may be updated based on experiences from real-world field operations, in addition to experiences generated by the simulator 210. That is, both simulated and real-world experiences may be used to update the policy to maximize the reward. In some implementations, only the final reward from the simulation 210 may be stored and not any intermediate reward values (e.g., as the simulator 210 may be a nonlinear system and immediate rewards may not carry information about the long-term effects of a particular action. It is also noted that the neural network may be trained and updated using other techniques in addition to, or instead of, the policy gradient discussed above.

In some embodiments, an action may be executed in a real-world setting in which the action has been determined based on the policy. For example, at 340, a field development planning system 220 may receive information identifying an action to take in the context of field development planning. Since the action is selected based on a deterministic policy that has been refined over several iterations, the selected action may maximize the reward, such as oil and gas recovery in relation to a cost of exploitation.

Figure 4:
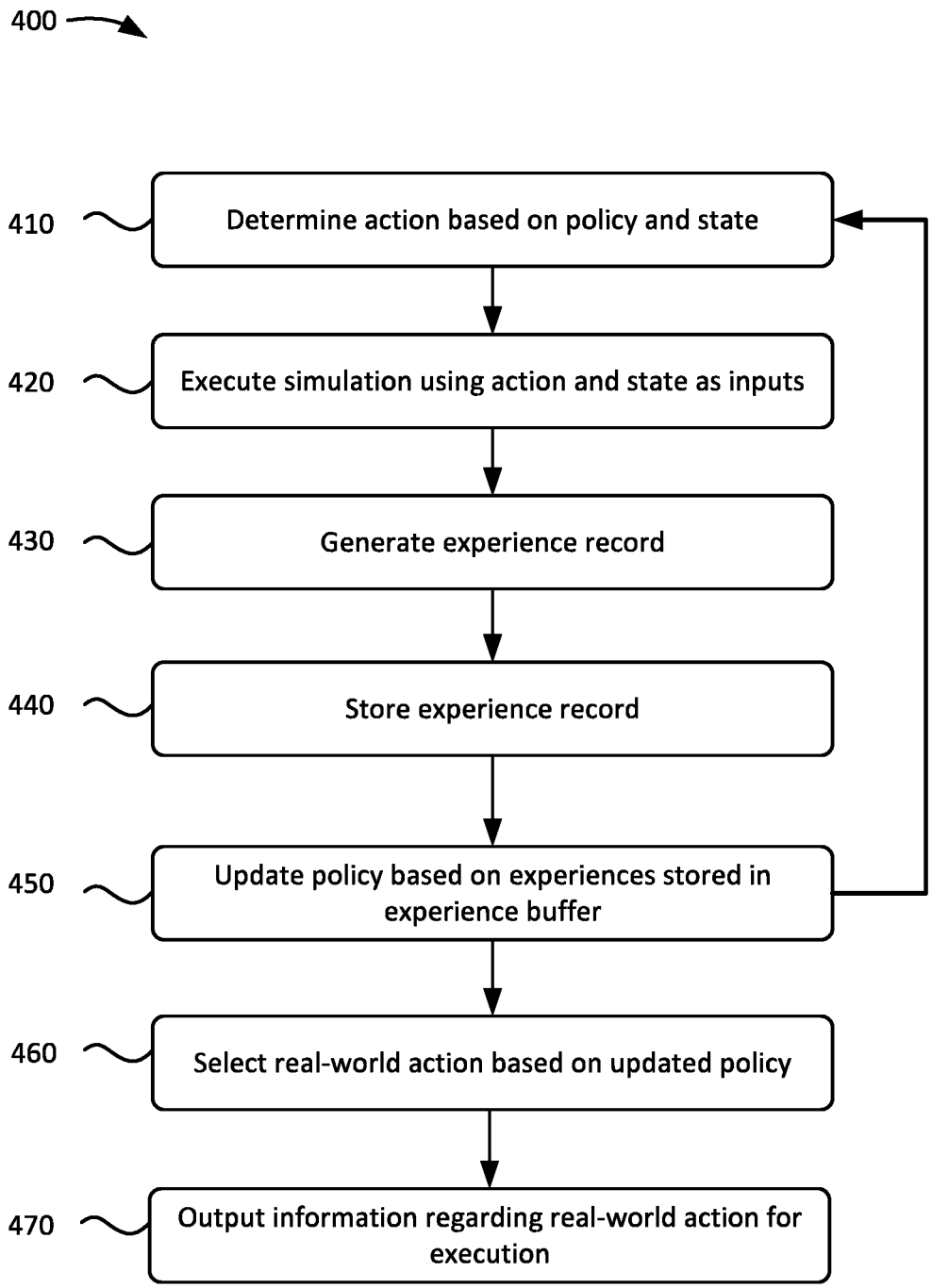
FIG. 4 shows an example flowchart of a process for incrementally updating a neural network policy using deep learning to maximize rewards.

FIG. 4 shows an example flowchart of a process 400 for incrementally updating a neural network policy using deep learning to maximize rewards. The actions show in FIG. 4 may be taken by one or more of the agent 205, the policy component 206, the simulator 210, the experience buffer 215, and/or the field development planning system 220. The flowchart illustrates at least one embodiment of the architecture, functionality, and operation of possible implementations of systems, methods, and computer program products according to various embodiments of the present disclosure.

As shown in FIG. 4, the process 400 includes determining an action based on a policy and state (e.g., as at block 410). For example, the agent 205 may determine an action based on an initial policy and an initial, preset state. In some embodiments, the initial policy may be preset and may identify the action associated with the state. As described herein, an action may include a single action or a series of multiple actions. In some embodiments, an action may include moving a rig a certain number of cells in a particular direction, drilling a well in a certain location, etc. Also, as noted herein, the agent 205 may determine a sequence of actions (e.g., one action, or multiple actions). That is, the term "action" may refer to a single action, or a sequence of multiple actions.

The process 400 also includes executing a simulation using the action and state as inputs (e.g., as at block 420). For example, the simulator 210 may execute the simulation. In some embodiments, the simulator 210 may be configured with a set of parameters for executing the simulation. For example, the simulator 210 may be configured with a recovery mechanism associated with a hydrocarbon field (e.g., deep water oil reservoirs, onshore tight gas, coalbed methane, etc.). Additionally or alternatively, the simulator may be figured with a cost scheme (e.g. export availability, drilling schedule, operational expenditure, etc.). Using these parameters, the simulator 210 may determine a reward based on the action and the state (e.g., a reward relating to oilfield production, a reduction in deployment costs, a reduction in deployment resource consumption, or other quantifiable reward in field development planning).

The process 400 further includes generating an experience record (e.g., as at block 430). For example, the simulator 210 may generate an experience record based on executing the simulation. As previously discussed, the experience record may identify an original state, the action taken, the new state that results from the action taken, and the reward or outcome of the action (which may be based on a comparison between the original state and the new state).

The process 400 also includes storing the experience record (e.g., as at block 440). For example, the experience record may be stored in the experience buffer 215, or other storage system.

The process 400 further includes updating a policy based on experiences stored in the experience buffer (e.g., as at block 450). For example, the agent 205 may communicate with the experience buffer 215 to update current policy based on the experience record generated at step 440 and experience records previously generated (if any). In some embodiments, the value function may also be updated as described above.

As described above with respect to FIG. 3, once a threshold number of experiences are obtained using the policy, a neural network or another type of machine learning model may be trained using a policy gradient algorithm (e.g., equation 1) or other reinforcement learning algorithms, such as DQN, Double DQN, etc. Further, total rewards and a policy update rule (for updating the policy) may be determined using equations 2-5, as described above.

As further shown in FIG. 4, the process 400 may return to block 410 in which a new action is selected based on the updated policy and state. Blocks 410-450 may be repeated to generate new experience records for continuous training of the neural network policy. In some embodiments, once the neural network has been sufficiently trained and the policy is considered to be reliable (e.g., after a threshold number of iterations and/or based on policy error and reliability testing), the process 400 may include selecting a real-world action based on the updated policy (step 460). For example, the agent 205 may select a real-world action to execute in the realm of field development planning (e.g., to select the best action or series of actions that maximize a reward).

The process 400 may further include outputting information regarding the real-world action for execution (block 470). For example, the simulator 210 may output information regarding the selected real-world action (or sequence of multiple actions) for execution (e.g., by the field development planning system 220). In this way, a trained neural network policy may be used to select an action (or series of actions) that maximize the reward (e.g., oil and gas recovery, cost reduction etc.) in field development planning. Accordingly, aspects of the present disclosure provide a Deep Reinforcement Learning framework for training a neural network that drives policies for selecting actions that maximize rewards.

Aspects of the present disclosure use a domain-specific approach. In certain embodiments, the rewards used in a loss function to scale may not be the actual final reward from the simulation (e.g., in scenarios having stability concerns). In some embodiments, a transformation may be applied scale the reward to lie between values of −1 and 1. From the individual experience datasets, the maximum total reward and the standard deviation may be determined. If the maximum total reward from all the simulations is negative, the rewards may be scaled and centered to be a standard normal distribution. Positive standardized rewards may be replaced with a value of 1 and non-positive reward may be replaced with a value of −1. The policy may be updated to select actions that, on average, give higher or "better" rewards, and not to take actions that lead to low or negative total rewards.

If the maximum total reward from the simulations is positive, the positive rewards are set as thresholds and scaled by a target reward value. Negative rewards are assigned a value of negative 1. This may ensure that the policy is updated towards taking actions that give positive rewards rather than those actions that give negative rewards. The target reward is the moved and/or adjusted based on the max total reward observed in a set of experiences. This may ensure that as the policy finds actions that result in positive rewards based on continuous learning and reinforcement.

While using the model to evaluate the policy on the simulator 210, the state is obtained (e.g., from observation or selection) and perform a forward pass to obtain action probabilities. The policy may be updated to select the action corresponding to the highest probability.

Figure 5:
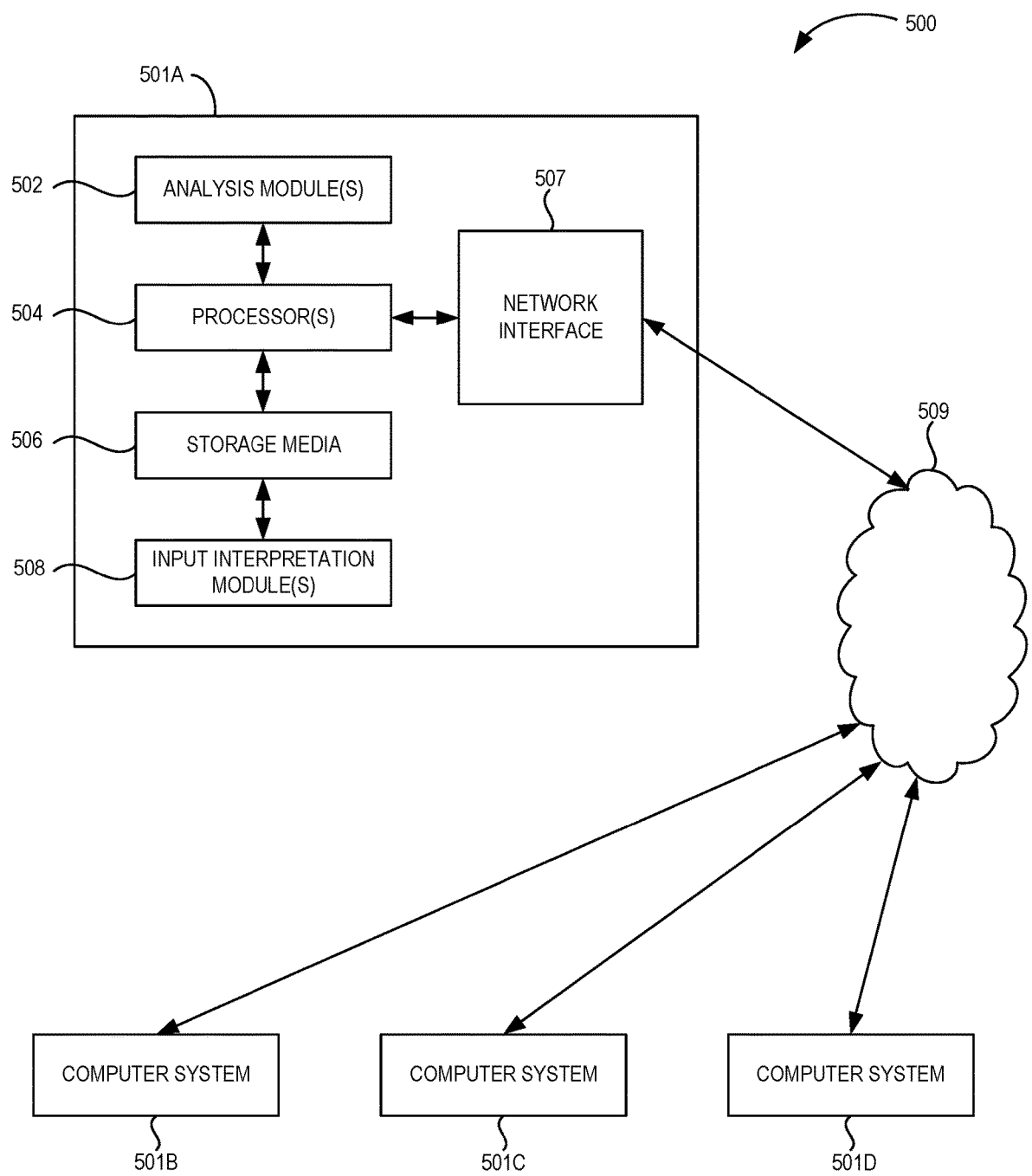
FIG. 5 illustrates a schematic view of a computing system, according to an embodiment.

In some embodiments, the methods of the present disclosure may be executed by a computing system. FIG. 5 illustrates an example of such a computing system 500, in accordance with some embodiments. The computing system 500 may include a computer or computer system 501A, which may be an individual computer system 501A or an arrangement of distributed computer systems. The computer system 501A includes one or more analysis modules 502 that are configured to perform various tasks according to some embodiments, such as one or more methods disclosed herein. To perform these various tasks, the analysis module 602 executes independently, or in coordination with, one or more processors 504, which is (or are) connected to one or more storage media 506. The processor(s) 504 is (or are) also connected to a network interface 507 to allow the computer system 501A to communicate over a data network 509 with one or more additional computer systems and/or computing systems, such as 501B, 501C, and/or 501D (note that computer systems 501B, 501C and/or 501D may or may not share the same architecture as computer system 501A, and may be located in different physical locations, e.g., computer systems 501A and 501B may be located in a processing facility, while in communication with one or more computer systems such as 501C and/or 501D that are located in one or more data centers, and/or located in varying countries on different continents).

A processor may include a microprocessor, microcontroller, processor module or subsystem, programmable integrated circuit, programmable gate array, or another control or computing device.

The storage media 506 may be implemented as one or more computer-readable or machine-readable storage media. Note that while in the example embodiment of FIG. 5 storage media 506 is depicted as within computer system 501A, in some embodiments, storage media 506 may be distributed within and/or across multiple internal and/or external enclosures of computing system 501A and/or additional computing systems. Storage media 506 may include one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories, magnetic disks such as fixed, floppy and removable disks, other magnetic media including tape, optical media such as compact disks (CDs) or digital video disks (DVDs), BLURAY® disks, or other types of optical storage, or other types of storage devices. Note that the instructions discussed above may be provided on one computer-readable or machine-readable storage medium, or may be provided on multiple computer-readable or machine-readable storage media distributed in a large system having possibly plural nodes. Such computer-readable or machine-readable storage medium or media is (are) considered to be part of an article (or article of manufacture). An article or article of manufacture may refer to any manufactured single component or multiple components. The storage medium or media may be located either in the machine running the machine-readable instructions, or located at a remote site from which machine-readable instructions may be downloaded over a network for execution.

In some embodiments, computing system 500 contains one or more policy updating module(s) 508. In the example of computing system 500, computer system 501A includes the policy updating module(s) 508. In some embodiments, a single policy updating module 508 may be used to perform some aspects of one or more embodiments of the methods disclosed herein. In other embodiments, a plurality of policy updating modules 508 may be used to perform some aspects of methods herein.

It should be appreciated that computing system 500 is merely one example of a computing system, and that computing system 500 may have more or fewer components than shown, may combine additional components not depicted in the example embodiment of FIG. 5, and/or computing system 500 may have a different configuration or arrangement of the components depicted in FIG. 5. The various components shown in FIG. 5 may be implemented in hardware, software, or a combination of both hardware and software, including one or more signal processing and/or application specific integrated circuits.

Further, the steps in the processing methods described herein may be implemented by running one or more functional modules in information processing apparatus such as general-purpose processors or application specific chips, such as ASICs, FPGAs, PLDs, or other appropriate devices. These modules, combinations of these modules, and/or their combination with general hardware are included within the scope of the present disclosure.

Computational interpretations, models, and/or other interpretation aids may be refined in an iterative fashion; this concept is applicable to the methods discussed herein. This may include the use of feedback loops executed on an algorithmic basis, such as at a computing device (e.g., computing system 500, FIG. 5), and/or through manual control by a user who may make determinations regarding whether a given step, action, template, model, or set of curves has become sufficiently accurate for the evaluation of the subsurface three-dimensional geologic formation under consideration.

The foregoing description, for the purpose of explanation, has been described with reference to specific embodiments. However, the illustrative discussions above are not intended to be exhaustive or limiting to the precise forms disclosed. Many modifications and variations are possible in view of the above teachings. Moreover, the order in which the elements of the methods described herein are illustrated and described may be re-arranged, and/or two or more elements may occur simultaneously. The embodiments were chosen and described in order to best explain the principles of the disclosure and its practical applications, to thereby enable others skilled in the art to best utilize the disclosed embodiments and various embodiments with various modifications as are suited to the particular use contemplated.

What is claimed is:

1. A method comprising:
   determining a field development action associated with field development planning for an oilfield, wherein the field development action is associated with selecting a position for a wellbore of the oilfield, and wherein determining the field development action is based on a field development policy for the oilfield;
   predicting an oil and gas recovery of the oilfield based on simulating the field development action for the oilfield at an initial state of the oilfield;
   generating a simulated experience record that includes the predicted oil and gas recovery, the field development action, the initial state of the oilfield, and a simulated resulting state;
   storing the simulated experience record in an experience buffer, wherein the experience buffer stores a plurality of previously generated experience records;
   generating an updated field development policy by providing the simulated experience record and the plurality of previously generated experience records stored in the experience buffer to a policy gradient neural network configured to process field development actions and associated oil and gas recoveries to determine field development policy updates;
   selecting an updated field development action associated with the field development planning for the oilfield based on the updated field development policy; and
   displaying information representing the updated field development action.

2. The method of claim 1, wherein the plurality of previously generated experience records includes real-world experience records, each real-world experience record including an observed oil and gas recovery for a real-world field development action taken during field development planning of one or more oilfields.

3. The method of claim 1, wherein the field development action is associated with moving a location of a drill rig of the oilfield.

4. The method of claim 1, wherein simulating the field development action includes configuring a set of parameters to predict the oil and gas recovery wherein the set of parameters includes at least one of a recovery mechanism, an export availability, a drilling schedule, or operational expenditure information.

5. The method of claim 1, wherein the initial state of the oilfield includes at least one of an estimate of oil distribution, an historical oil production rate, additional data gained from previous wells, a rig location, or a well location.

6. The method of claim 1, wherein the policy gradient neural network determines the field development policy updates for improving the oil and gas recovery.

7. The method of claim 6, wherein improving the oil and gas recovery includes at least one of an increase in revenue from oil production, a reduction in deployment costs, or a reduction in deployment resource consumption.

8. The method of claim 1, wherein the experience buffer stores a combination of previously generated simulated experience records and real-world experience records.

9. The method of claim 1, wherein the policy gradient neural network is trained to determine the field development policy updates based on a reinforced learning framework.

10. The method of claim 1, further comprising implementing the updated field development action for the oilfield.

11. A computing system, comprising:
    one or more processors; and
    a memory system comprising one or more non-transitory computer-readable media storing instructions that, when executed by at least one of the one or more processors, cause the computing system to perform operations, the operations comprising:
    determining a field development action related to field development planning for an oilfield, wherein the field development action is associated with selecting a position for a wellbore of the oilfield, and wherein determining the field development action is based on a field development policy for the oilfield;

predicting an oil and gas recovery based on simulating the field development action for the oilfield at an initial state of the oilfield;

generating a simulated experience record that includes the predicted oil and gas recovery, the field development action, the initial state of the oilfield, and a simulated resulting state of the oilfield;

storing the simulated experience record in an experience buffer;

generating an updated field development policy by providing the simulated experience record stored in the experience buffer to a policy gradient neural network configured to process field development actions and associated oil and gas recoveries to determine field development policy updates;

selecting an updated field development action for selecting an updated position for the wellbore based on the updated field development policy; and displaying information indicating the updated position for the wellbore.

12. The computing system of claim 11, wherein the experience buffer includes real-world experience records indicating observed oil and gas recoveries for real-world field development actions taken during field development planning of one or more oilfields.

13. The computing system of claim 11, wherein the initial state includes an estimate of oil distribution, an historical oil production rate, a rig location, and a well location.

14. The computing system of claim 11, wherein the policy gradient neural network determines the field development policy updates for improving the oil and gas recovery.

15. The computing system of claim 14, wherein improving the oil and gas recovery includes an increase in revenue from oil production, a reduction in deployment costs, and a reduction in deployment resource consumption.

16. The computing system of claim 11, wherein the experience buffer includes a plurality of previously generated simulated experience records.

17. The computing system of claim 11, wherein simulating the oil and gas recovery is based on parameters including a recovery mechanism of the oilfield, an export availability for the oilfield, a drilling schedule for the oilfield, and an operational expenditure for the oilfield.

18. A non-transitory computer-readable medium storing instructions that, when executed by one or more processors of a computing system, cause the computing system to perform operations, the operations comprising:

determining a field development action associated with field development planning for an oilfield based on a field development policy;

predicting an oil and gas recovery of the oilfield based on simulating the field development action for the oilfield at an initial state of the oilfield;

generating a simulated experience record that includes the predicted oil and gas recovery, the field development action, the initial state of the oilfield, and a simulated resulting state of the oilfield;

identifying a plurality of real-world experience records, each real-world experience record including an observed oil and gas recovery for a real-world field development action taken during field development planning of one or more oilfields;

storing the simulated experience record and the plurality of real-world experience records in an experience buffer;

generating an updated field development policy by providing the simulated experience record and the plurality of real-world experience records stored in the experience buffer to a policy gradient neural network configured to process field development actions and associated oil and gas recoveries to determine field development policy updates;

selecting an updated field development action based on the updated field development policy; and displaying information representing the updated field development action.

19. The non-transitory computer-readable medium of claim 18, wherein predicting the oil and gas recovery includes predicting a quantity of exploitation and a cost of exploitation of oil and gas for the oilfield based on simulating the field development action for the oilfield.

20. The non-transitory computer-readable medium of claim 19, wherein the policy gradient neural network determines the field development policy updates for increasing the quantity of exploitation and decreasing the cost of exploitation of oil and gas for the oilfield.

* * * * *